(12) United States Patent
Iwasaki (10) Patent No.: US 10,166,828 B2
(45) Date of Patent: Jan. 1, 2019

(54) SUSPENSION DEVICE FOR AMPHIBIOUS VEHICLE

(71) Applicant: MITSUBISHI HEAVY INDUSTRIES, LTD., Tokyo (JP)

(72) Inventor: Koji Iwasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/522,903

(22) PCT Filed: Nov. 7, 2014

(86) PCT No.: PCT/JP2014/079642
§ 371 (c)(1),
(2) Date: Apr. 28, 2017

(87) PCT Pub. No.: WO2016/072030
PCT Pub. Date: May 12, 2016

(65) Prior Publication Data
US 2017/0313148 A1 Nov. 2, 2017

(51) Int. Cl.
*B60F 3/00* (2006.01)
*B60G 11/30* (2006.01)
(Continued)

(52) U.S. Cl.
CPC .............. *B60F 3/003* (2013.01); *B60G 11/30* (2013.01); *B60G 17/04* (2013.01); *B60G 17/056* (2013.01);
(Continued)

(58) Field of Classification Search
CPC ....................................................... B60F 3/003
See application file for complete search history.

(56) References Cited

U.S. PATENT DOCUMENTS

| | | | |
|---|---|---|---|
| 4,447,073 A | 5/1984 | Brandstadter | |
| 4,721,327 A | 1/1988 | Chauveau et al. | |
| | (Continued) | | |

FOREIGN PATENT DOCUMENTS

| | | | |
|---|---|---|---|
| JP | 54-97932 A | 8/1979 | |
| JP | 56-53969 A | 5/1981 | |
| | (Continued) | | |

OTHER PUBLICATIONS

International Search Report, issued in PCT/JP2014/079642, dated Jan. 27, 2015.

(Continued)

*Primary Examiner* — Stephen P Avila
(74) *Attorney, Agent, or Firm* — Birch, Stewart, Kolasch & Birch, LLP (57) ABSTRACT

A pressure system of a suspension device for an amphibious vehicle includes: a pump configured to discharge a working fluid; a first control valve disposed in a first flow path extending between the pump and a first hydraulic chamber, the first control valve being configured to control supply of the working fluid from the pump to the first hydraulic chamber; a pilot check valve disposed in a portion of the first flow path which extends between the first hydraulic chamber and the first control valve, the pilot check valve being configured to open and close the first flow path in accordance with a pilot pressure; and a second control valve disposed in a pilot flow path extending between the pump and the pilot check valve, the second control valve being configured to control supply of the pilot pressure to the pilot check valve.

12 Claims, 7 Drawing Sheets

(51) Int. Cl.
  *B60G 17/04* (2006.01)
  *B62D 55/112* (2006.01)
  *B60G 17/056* (2006.01)

(52) U.S. Cl.
  CPC ........ *B62D 55/112* (2013.01); *B60F 2301/00* (2013.01); *B60F 2301/04* (2013.01); *B60G 2204/47* (2013.01); *B60G 2300/28* (2013.01); *B60G 2300/32* (2013.01); *B60G 2500/30* (2013.01)

(56) References Cited

U.S. PATENT DOCUMENTS

| 4,858,736 | A | 8/1989 | Arnaud et al. |
| 7,963,537 | B2 | 6/2011 | Stockford |
| 2003/0047899 | A1 | 3/2003 | Gibbs |
| 2009/0124142 | A1 | 5/2009 | Wernicke et al. |
| 2011/0291472 | A1 | 12/2011 | Holman et al. |

FOREIGN PATENT DOCUMENTS

| JP | 2-33138 U | 3/1990 |
| JP | 3-139409 A | 6/1991 |
| JP | 3-182827 A | 8/1991 |
| JP | 4-334677 A | 11/1992 |
| JP | 8-2453 A | 1/1996 |
| JP | 9-202272 A | 8/1997 |
| JP | 2003-529487 A | 10/2003 |
| JP | 2009-149238 A | 7/2009 |
| JP | 2009-179095 A | 8/2009 |
| JP | 2010-120547 A | 6/2010 |
| JP | 2011-235866 A | 11/2011 |
| JP | 2012-121434 A | 6/2012 |

OTHER PUBLICATIONS

International Preliminary Report on Patentability and the English translation of the Written Opinion of the International Searching Authority (Forms PCT/IB/326, PCT/IB/338, PCT/IB/373 and PCT/ISA/237), dated May 18, 2017, for International Application No. PCT/JP2014/079642.

SUSPENSION DEVICE FOR AMPHIBIOUS VEHICLE

TECHNICAL FIELD

The present disclosure relates to a suspension device for an amphibious vehicle.

BACKGROUND ART

A known suspension device for an amphibious vehicle is equipped with wheels that can be receded from a position for traveling on road, so as to reduce resistance on water. For instance, Patent Document 1 discloses a hydraulic suspension strut whereby wheels can be drawn back through upward movement of a piston and a connection road by supplying a liquid to the second chamber disposed in a cylinder and discharging a liquid from the first chamber.

CITATION LIST

Patent Literature

Patent Document 1: JP2003-529487A (translation of a PCT application) (see e.g. paragraphs 0033, 0034, FIG. 3).

SUMMARY

Problems to be Solved

In the case of the hydraulic suspension strut disclosed in Patent Document 1, the hydraulic pressure of the first chamber rises when a shock load is applied thereto while the vehicle is running on land, for the second on/off valve is closed. When the hydraulic pressure of the first chamber becomes a high pressure, oil may leak outside from an upper line or from the second on/off valve, or oil leakage may occur inside the second on/off valve.

In view of this, an object of at least one embodiment of the present invention is to provide a suspension device for an amphibious vehicle which can pull up wheels by hydraulic pressure and which is free from liquid leakage.

Solution to the Problems

According to at least one embodiment of the present invention, provided is a suspension device for an amphibious vehicle, which comprises: a hydraulic cylinder including a cylinder body and a piston which is disposed slidably inside the cylinder body and which defines a first hydraulic chamber and a second hydraulic chamber inside the cylinder body; an accumulator connected to the first hydraulic chamber of the hydraulic cylinder; and a pressure system configured to selectively perform supply of a working fluid to one of the first hydraulic chamber or the second hydraulic chamber of the hydraulic cylinder and discharge of the working fluid from the other one of the first hydraulic chamber or the second hydraulic chamber. The pressure system includes: a pump configured to discharge the working fluid; a first control valve disposed in a first flow path extending between the pump and the first hydraulic chamber, the first control valve being configured to control supply of the working fluid from the pump to the first hydraulic chamber; a pilot check valve disposed in a portion of the first flow path which extends between the first hydraulic chamber and the first control valve, the pilot check valve being configured to open and close the first flow path in accordance with a pilot pressure; and a second control valve disposed in a pilot flow path extending between the pump and the pilot check valve, the second control valve being configured to control supply of the pilot pressure to the pilot check valve.

With this configuration, the pressure system is configured to perform, selectively, supply of the working fluid to one of the first hydraulic chamber or the second hydraulic chamber and discharge of the working fluid from the other, which makes it possible to pull up wheels when the vehicle is traveling on water.

Furthermore, with this configuration, if a high pressure is generated in the first hydraulic chamber when the pilot check valve is closed during travel on land, a high pressure is applied to the pilot check valve. The pilot check valve has an excellent sealing performance, and thus there is substantially no risk of liquid leakage. Furthermore, since the high pressure is blocked by the pilot check valve, the high pressure is not applied to the first control valve and to a portion of the flow path between the pilot check valve and the first control valve, which also prevents liquid leakage from the first control valve and from the portion of the first flow path between the pilot check valve and the first control valve. Thus, with the above configuration, liquid leakage is prevented through a simple configuration.

In some embodiments, the suspension device for an amphibious vehicle further comprises at least one pressure-regulation valve for regulating a pressure of the working fluid discharged from the pump.

If the hydraulic pressure in the first hydraulic chamber is too low when landing, the capacity of the gas-pressure chamber changes more considerably. Accordingly, the upward-and-downward movement of the wheeld becomes harder when landing, thus resulting in a considerable change in the attitude of the amphibious vehicle. Further, if the hydraulic pressure of the first hydraulic chamber is too low when traveling on land, the vehicle height of the amphibious vehicle becomes too low. In contrast, if the hydraulic pressure is too high, the vehicle height may become too high. In this regard, with this configuration, the pressure-regulation valve regulates the pressure of the working fluid discharged from the pump, and thereby the hydraulic pressure of the first hydraulic chamber can be maintained in an appropriate range. As a result, it is possible to stabilize the attitude of the amphibious vehicle when landing, and to maintain the vehicle height of the amphibious vehicle appropriately while traveling on land.

In some embodiments, the at least one pressure-regulation valve comprises a first pressure-regulation valve configured to regulate a pressure of the working fluid to be supplied to the first hydraulic chamber, and a second pressure-regulation valve configured to regulate a pressure of the working fluid to be supplied to the second hydraulic chamber. The pressure of the working fluid regulated by the second pressure-regulation valve is lower than the pressure of the working fluid regulated by the first pressure-regulation valve.

With this configuration, the pressure (first pressure) of the working fluid supplied to the first hydraulic chamber is a pressure required to adjust the capacity of the gas-pressure chamber of the accumulator to an appropriate range, which is, in other words, a pressure required to support the vehicle body of the amphibious vehicle. In contrast, the pressure (second pressure) of the working fluid supplied to the second hydraulic chamber is a pressure required to pull up the wheels when the vehicle travels on water, which is a pressure required to support the wheels. Thus, the second pressure may be smaller than the first pressure. Furthermore, reducing the second pressure by using the second pressure-regulation valve makes it possible to use a low-pressure type pipe or the like to form the flow path between the second pressure-regulation valve and the second hydraulic chamber, and thereby it is possible to reduce the costs.

In some embodiments, the suspension device for an amphibious vehicle further comprises: a base having a main shaft portion, the base being mountable to a vehicle body of the amphibious vehicle; a hub being engaged rotatably with the main shaft portion; and an arm provided integrally with the hub. The hydraulic cylinder and the accumulator are disposed inside the arm.

With this configuration, the hydraulic cylinder and the accumulator are disposed inside the arm, and thus it is no longer necessary to provide the hydraulic cylinder and the accumulator on the side of the vehicle body, which makes it possible to save the space.

In some embodiments, the pilot check valve is disposed inside the arm.

With this configuration, the pilot check valve is disposed inside the arm, and thereby the distance between the first hydraulic chamber and the pilot check valve can be reduced. Thus, when the hydraulic pressure of the first hydraulic chamber reaches a high pressure, the high pressure is applied to a smaller region, and thereby it is possible to prevent liquid leakage even more reliably.

In some embodiments, the pilot check valve is disposed closer to a distal end side of the arm than the hydraulic cylinder.

With this configuration, the pilot check valve can be disposed inside the arm through a simple configuration.

In some embodiments, the arm includes a block constituting a distal end portion of the arm, the pilot check valve is mounted to the block, and an inner channel which brings the first hydraulic chamber and the pilot check valve into communication is disposed inside the block.

With this configuration, the pilot check valve and the first hydraulic chamber can communicate with each other simply through the inner channel.

In some embodiments, an inner channel which brings the pilot check valve and the first control valve into communication is formed inside the arm.

With this configuration, it is possible to reduce the length of pipe outside the arm, thus reducing the size and weight and improving durability against dirt and the like.

In some embodiments, the suspension device for an amphibious vehicle further comprises a sleeve having a hollow cylindrical shape and being formed integrally with the hub. The base includes a solid cylindrical portion which protrudes from the main shaft portion and which engages with the sleeve. The solid cylindrical portion has a plurality of circumferential grooves formed on an outer periphery of the solid cylindrical portion. The sleeve has a plurality of communication holes formed corresponding to the plurality of circumferential grooves. The plurality of circumferential grooves each have a bottom surface on which an opening of an end of a corresponding one of a plurality of inner channels is formed, the plurality of inner channels extending through the main shaft portion and the solid cylindrical portion.

The arm rotates relative to the main shaft portion and to the vehicle body, which raises a problem in the connection structure between the inner channels of the arm (movable side) and the vehicle side (stationary side). With this configuration, the circumferential grooves are formed on the outer periphery of the solid cylindrical portion, which is on the stationary side, and thereby it is possible to bring the inner channels of the arm and the channel of the stationary side into communication at a predetermined rotational angle.

In some embodiments, the suspension device for an amphibious vehicle further comprises: a base mountable to a vehicle of the amphibious vehicle; a rotational shaft supported rotatably by the base; and a conversion mechanism configured to convert reciprocating motion of the piston into reciprocating motion of the rotational shaft. The hydraulic cylinder and the accumulator are mountable inside a vehicle body of the amphibious vehicle.

With this configuration, the hydraulic cylinder and the accumulator can be disposed inside the vehicle body, and thus the hydraulic cylinder, the accumulator, and the like can be easily replaced. Accordingly, the suspension device for an amphibious vehicle has a high expandability.

In some embodiments, the suspension device for an amphibious vehicle further comprises a block connecting an end portion of the hydraulic cylinder and an end portion of the accumulator. The pilot check valve is attached to the accumulator. An inner channel which brings the first hydraulic chamber and the pilot check valve into communication is disposed inside the block.

With this configuration, the pilot check valve and the first hydraulic chamber can communicate with each other simply through the inner channel.

Advantageous Effects

According to at least one embodiment of the present invention, it is possible to provide a suspension device for an amphibious vehicle which can pull up wheels by hydraulic pressure and which is free from liquid leakage.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
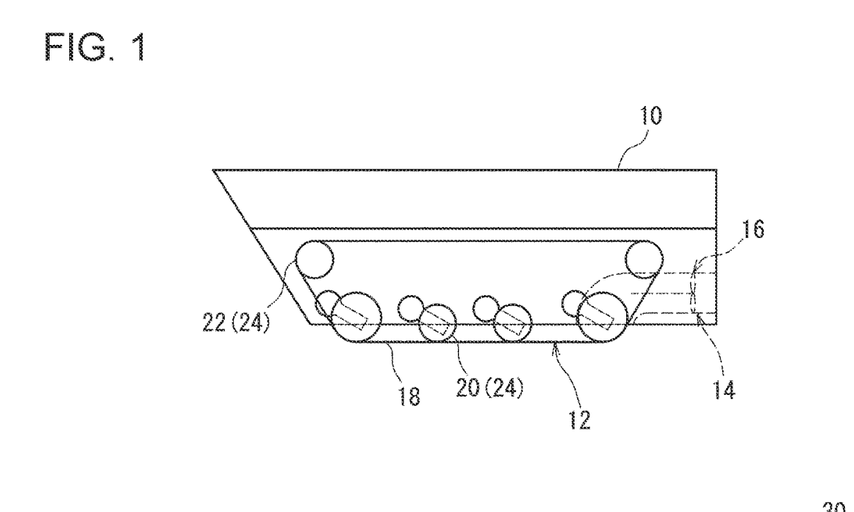
FIG. 1 is a schematic configuration diagram of an amphibious vehicle according to some embodiments.

FIG. 1 is a schematic configuration diagram of an amphibious vehicle equipped with a suspension device for an amphibious vehicle according to some embodiments.

The amphibious vehicle includes a vehicle body 10, a land traveling device 12, and a water propelling device 14. The water propelling device 14 comprises, for instance, a water jet 16 or a propeller.

The land traveling device 12 includes, for instance, a crawler (endless track, caterpillar) 18, track rollers 20 that define the track of the crawler 18, sprockets 22 for driving the crawler 18, and a suspension device disposed between the vehicle body 10 and rotational elements (wheels) 24 including the track rollers 20 and the sprockets 22. In some embodiments, the land traveling device 12 includes tires, which serve as the rotational elements 24, and the suspension device.

Figure 2:
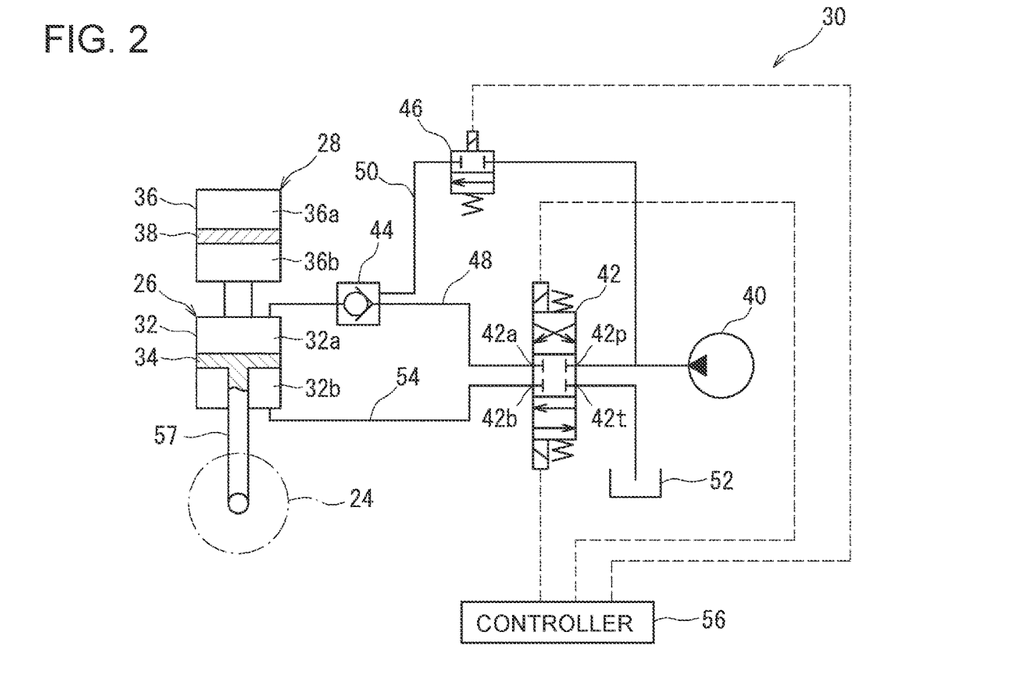
FIG. 2 is a schematic configuration diagram of a suspension device for an amphibious vehicle according to some embodiments, in a state where the amphibious vehicle is traveling on land.

FIG. 2 is a schematic configuration diagram of a suspension device for an amphibious vehicle. The suspension device includes a hydraulic cylinder 26, an accumulator 28, and a pressure system 30.

The hydraulic cylinder 26 includes a cylinder body 32 and a piston 34. The piston 34 is disposed slidably inside the cylinder body 32, and defines a first hydraulic chamber 32a and a second hydraulic chamber 32b air-tightly inside the cylinder body 32.

The accumulator 28 is connected to the first hydraulic chamber 32a of the hydraulic cylinder 26. In some embodiments, the accumulator 28 includes a cylinder body 36 and a piston 38. The piston 38 is disposed slidably inside the cylinder body 36, and defines a gas-pressure chamber 36a and a hydraulic chamber 36b air-tightly inside the cylinder body 36. The accumulator 28 functions as an air spring for stabilizing the attitude of the vehicle when a shock load is applied to the wheel 24 due to rough road surface or the like while the amphibious vehicle is traveling on land, by compressing gas inside the gas-pressure chamber 36a to absorb a working fluid that flows into the hydraulic chamber 36b from the hydraulic cylinder 26 and generating a strong reaction force against the wheel 24 with the compressed high-pressure gas.

The gas-pressure chamber 36a is filled with a predetermined amount of gas, and the position of the piston 38 is determined so as to balance the pressure inside the gas-pressure chamber 36a and the pressure inside the hydraulic chamber 36b. The first hydraulic chamber 32a of the hydraulic cylinder 26 is in communication with the hydraulic chamber 36b of the accumulator 28, and the position of the piston 38 is determined so as to balance the pressure inside the gas-pressure chamber 36a and the pressure inside the first hydraulic chamber 32a.

The pressure system 30 is configured to perform, selectively, supply of the working fluid to one of the first hydraulic chamber 32a or the second hydraulic chamber 32b of the hydraulic cylinder 26, and discharge of the working fluid from the other. In some embodiments, the working fluid is a liquid; for instance, oil.

Specifically, the pressure system 30 includes a pump 40, a first control valve 42, a pilot check valve 44, and a second control valve 46.

The pump 40 is configured to discharge the working fluid. The first control valve 42 is disposed in the first flow path 48 that extends between the pump 40 and the first hydraulic chamber 32a of the hydraulic cylinder 26, and is configured to control supply of the working fluid from the pump 40 to the first hydraulic chamber 32a.

The pilot check valve 44 is disposed in a portion of the first flow path 48 that extends between the first hydraulic chamber 32a of the hydraulic cylinder 26 and the first control valve 42. The pilot check valve 44 is configured to open and close the first flow path 48 in accordance with a pilot pressure. When the pilot pressure is not provided, the pilot check valve 44 operates as a normal check valve to permit a flow of the working fluid in a direction flowing into the first hydraulic chamber 32a (normal direction), and prevent a flow of the working fluid in a direction flowing out from the first hydraulic chamber 32a (reverse direction). When supplied with the pilot pressure, the pilot check valve 44 operates so as to permit a flow of the working fluid in a direction flowing out from the first hydraulic chamber 32a.

The second control valve 46 is disposed in a pilot flow path 50 that extends between the pump 40 and the pilot check valve 44, and is configured to control supply of the pilot pressure to the pilot check valve 44.

Further, the pressure system 30 includes a tank 52 configured to store the working fluid, and the second flow path 54 extends between the tank 52 and the second hydraulic chamber 32b of the hydraulic cylinder 26.

In some embodiments, the first control valve 42 is a four-port three-position switch valve disposed in the first flow path 48, and also in the second flow path 54. Specifically, the first control valve 42 includes a P-port 42p, a T-port 42t, an A-port 42a, and a B-port 42b. The P-port 42p is connected to the pump 40, the T-port 42t to the tank 52, the A-port 42a to the first hydraulic chamber 32a, and the B-port 42b to the second hydraulic chamber 32b.

The first control valve 42 takes three positions that can be switched from one to another: closed position, first open position, and second open position. In the closed position, all of the P-port 42p, the T-port 42t, the A-port 42a, and the B-port 42b are closed. In the first open position, the P-port 42p and the A-port 42a are in communication, and the T-port 42t and the B-port 42b are in communication. In the second open position, the P-port 42p and the B-port 42b are in communication, and the T-port 42t and the A-port 42a are in communication.

In some embodiments, the suspension device includes a controller 56 for operating the first control valve 42 and the second control valve 46. The controller 56 comprises, for instance, a computer including a central processing unit (CPU), a memory, and an external storage. In some embodiments, the first control valve 42 and the second control valve 46 are solenoid control valves. The controller 56 can control operation of the first control valve 42 and the second control valve 46 by controlling electric signals supplied to the first control valve 42 and the second control valve 46.

Figure 3:
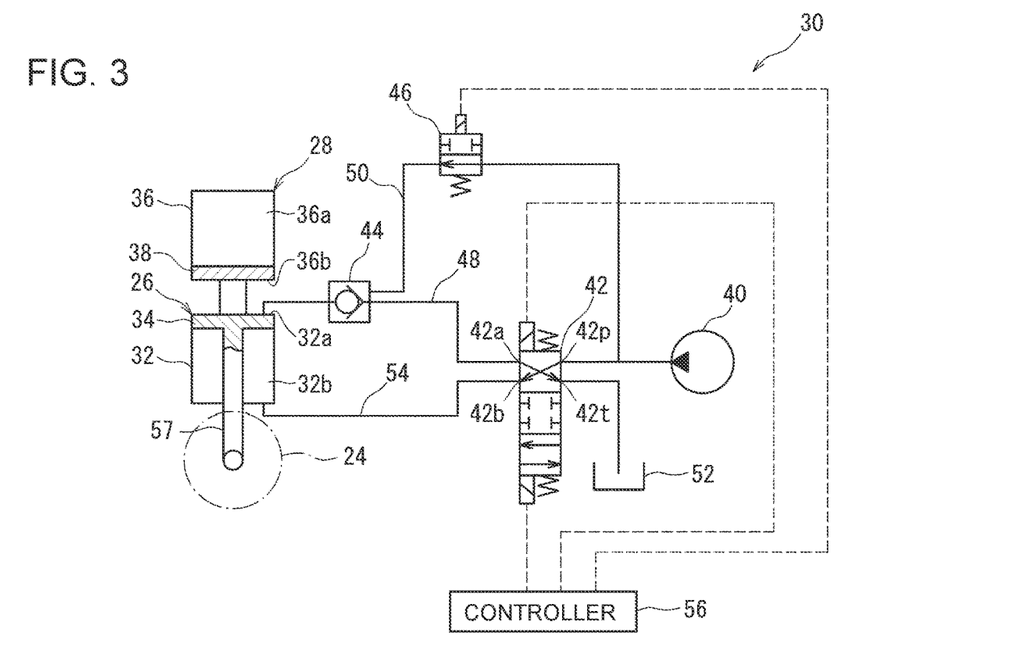
FIG. 3 is a diagram of the suspension device in FIG. 2 when the wheel is pulled up.
Figure 4:
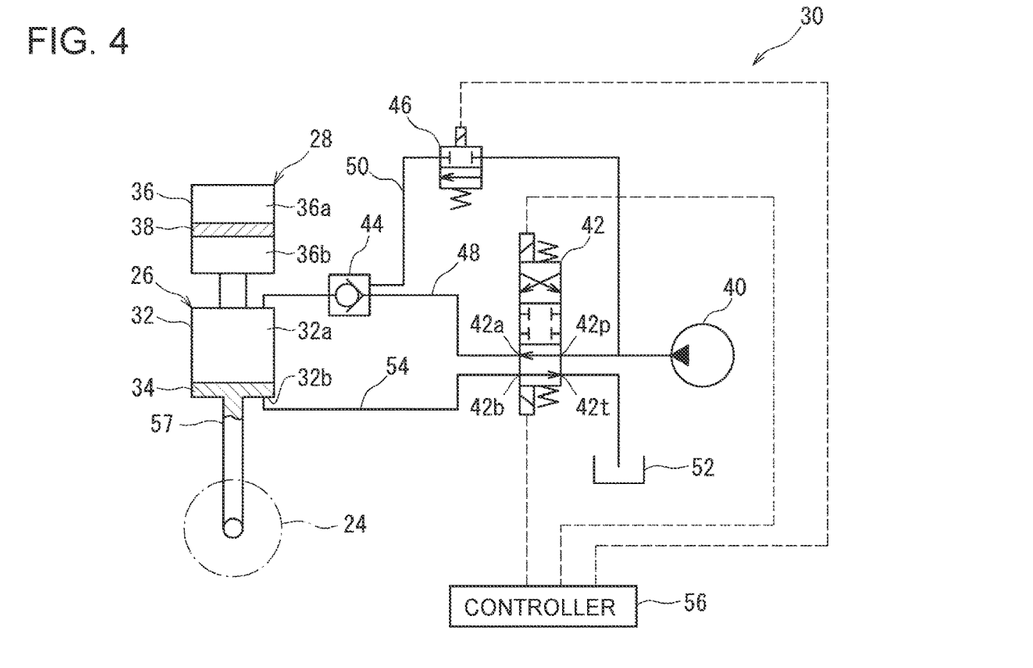
FIG. 4 is a diagram of the suspension device in FIG. 2 when the wheel is suspended.

FIG. 2 is a diagram showing the first control valve 42 and the second control valve 46 when the amphibious vehicle is traveling on land. FIG. 3 is a diagram showing the first control valve 42 and the second control valve 46 when the wheel 24 is pulled up for on-water travel. FIG. 4 is a diagram showing the first control valve 42 and the second control valve 46 when the wheel 24 is suspended as the vehicle moves from water to land.

As depicted in FIG. 2, when the vehicle is traveling on land, the first control valve 42 and the second control valve 46 are both set in closed positions. In this state, the pressure of the first hydraulic chamber 32a is maintained at an appropriate pressure, and the capacity of the gas-pressure chamber 36a of the accumulator 28 is maintained at an appropriate size.

As depicted in FIG. 3, when the wheel 24 is pulled up, the first control valve 42 is set in the second open position, and the second control valve 46 is set in the open position. In this state, the pilot check valve 44 is supplied with the pilot pressure from the pump 40, and the pilot check valve 44 permits the working fluid to flow out from the hydraulic chamber 32a. Further in this state, the working fluid is supplied to the second hydraulic chamber 32b from the pump 40, and thereby the piston 34 moves in a direction to contract the first hydraulic chamber 32a (the first direction/pulling-up direction), and thus the working fluid is discharged from the first hydraulic chamber 32a.

In some embodiments, the piston 34 is coupled to the wheel 24 via a connection rod 57, and the wheel 24 is pulled up as the piston 34 moves in the pulling-up direction. In this state, the pressure of the first hydraulic chamber 32a decreases, and the gas-pressure chamber 36a of the accumulator 28 expands.

As depicted in FIG. 4, when the wheel 24 is suspended, the first control valve 42 is set in the first open position, and the second control valve 46 is set in the closed position. In this state, the pilot check valve 44 permits the working fluid to flow toward the first hydraulic chamber 32a. Further in this state, the working fluid is supplied to the first hydraulic chamber 32a from the pump 40, and thereby the piston 34 moves in a direction to expand the first hydraulic chamber 32a (the second direction/suspending direction), and the working fluid is discharged from the second hydraulic chamber 32b. As the piston 34 moves in the suspending direction, the wheel 24 becomes suspended.

With the above configuration, the pressure system 30 is configured to perform, selectively, supply of the working fluid to one of the first hydraulic chamber 32a or the second hydraulic chamber 32b, and discharge of the working fluid from the other, and thereby it is possible to pull the wheel 24 higher up when the vehicle is traveling on water than when traveling on land.

Furthermore, with this configuration, a high pressure is generated in the first hydraulic chamber 32a in response to a shock load that may be applied to the wheel 24 due to rough ground surface or the like when the pilot check valve 44 is closed during travel on land. Generation of a high pressure in the first hydraulic chamber 32a causes a high pressure to be applied to the pilot check valve 44.

Even in this case, the pilot check valve 44 has an excellent sealing performance, and thus there is substantially no risk of liquid leakage to outside from the pilot check valve 44, or liquid leakage inside the pilot check valve 44. Furthermore, since the high pressure is blocked by the pilot check valve 44, the high pressure is not applied to the first control valve 42 and to a portion of the first flow path 48 between the pilot check valve 44 and the first control valve 42, which also prevents liquid leakage from the first control valve 42 and from the portion of the first flow path 48. Thus, with the above configuration, liquid leakage is prevented through a simple configuration.

In some embodiments, when the wheel 24 is suspended, the working fluid is supplied to the first hydraulic chamber 32a until the capacity of the gas-pressure chamber 36a of the accumulator 28 contracts to an appropriate size, or in other words, until the capacity reaches a target capacity for travel on land.

With this configuration, the capacity of the gas-pressure chamber 36a of the accumulator 28 is contracted to an appropriate size when the wheel 24 is suspended, which suppresses a change in the capacity of the gas-pressure chamber 36a due to loads applied to the wheel 24 when the wheel 24 makes contact with ground. Thus, the upward-and-downward movement of the wheel 24 is suppressed during landing, and thus the attitude of the amphibious vehicle is stabilized.

Figure 5:
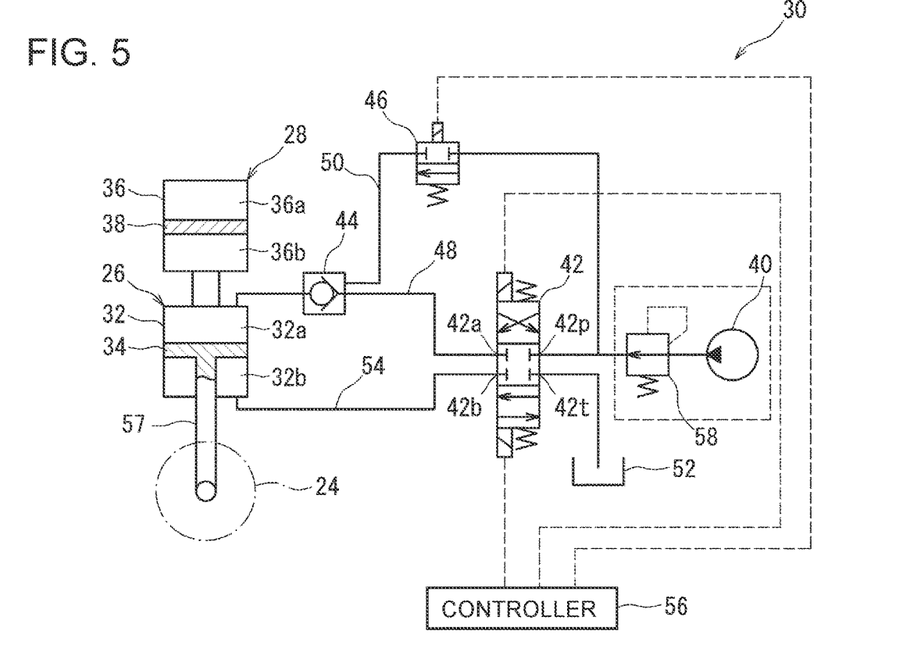
FIG. 5 is a schematic configuration diagram of a suspension device for an amphibious vehicle according to some embodiments.

In some embodiments, the suspension device further includes at least one pressure-regulation valve for regulating the pressure of the working fluid discharged from the pump 40. FIG. 5 is a schematic configuration diagram of a suspension device for an amphibious vehicle according to some embodiments, where the suspension device includes a pressure-regulation valve 58 built into the pump 40, which serves as the at least one pressure-regulation valve. The pressure-regulation valve 58 may be disposed outside the pump 40.

If the hydraulic pressure in the first hydraulic chamber 32a is too low when landing, the capacity of the gas-pressure chamber 36a changes more considerably. Accordingly, the upward-and-downward movement of the wheel 24 becomes harder when landing, thus resulting in a considerable change in the attitude of the amphibious vehicle. Further, if the hydraulic pressure of the first hydraulic chamber 32a is too low when traveling on land, the vehicle height of the amphibious vehicle becomes too low. In contrast, if the hydraulic pressure is too high, the vehicle height may become too high. In this regard, with this configuration, the pressure-regulation valve 58 regulates the pressure of the working fluid discharged from the pump 40, and thereby the hydraulic pressure of the first hydraulic chamber 32a can be maintained in an appropriate range. As a result, it is possible to stabilize the attitude of the amphibious vehicle when landing, and to maintain the vehicle height of the amphibious vehicle appropriately while traveling on land.

Figure 6:
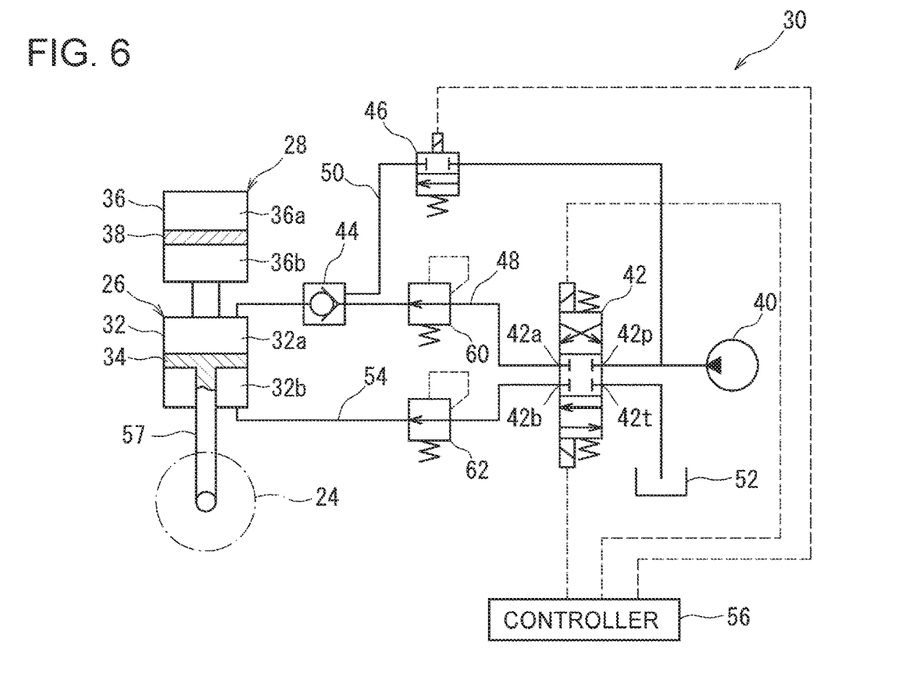
FIG. 6 is a schematic configuration diagram of a suspension device for an amphibious vehicle according to some embodiments.

FIG. 6 is a schematic configuration diagram of a suspension device for an amphibious vehicle according to some embodiments. The suspension device depicted in FIG. 6 has at least one pressure-regulation valve, including: the first pressure-regulation valve 60 configured to regulate the pressure of the working fluid to be supplied to the first hydraulic chamber 32a; and the second pressure-regulation valve 62 configured to regulate the pressure of the working fluid to be supplied to the second hydraulic chamber 32b. The pressure of the working fluid regulated by the second pressure-regulation valve 62 is lower than the pressure of the working fluid regulated by the first pressure-regulation valve 60.

With this configuration, the pressure (first pressure) of the working fluid supplied to the first hydraulic chamber 32a is a pressure required to adjust the capacity of the gas-pressure chamber 36a of the accumulator 28 to an appropriate range, which is, in other words, a pressure required to support the vehicle body of the amphibious vehicle. In contrast, the pressure (second pressure) of the working fluid supplied to the second hydraulic chamber 32b is a pressure required to pull up the wheel 24 when the vehicle travels on water, which is a pressure required to support the wheel 24. Thus, the second pressure may be smaller than the first pressure. Furthermore, reducing the second pressure by using the second pressure-regulation valve 62 makes it possible to use a low-pressure type pipe or the like to form the flow path between the second pressure-regulation valve 62 and the second hydraulic chamber 32b, and thereby it is possible to reduce the costs.

Further, the first pressure-regulation valve 60 and the second pressure-regulation valve 62 are configured to permit flows of the working fluid in directions flowing out from the first hydraulic chamber 32a and the second hydraulic chamber 32b, respectively.

In some embodiments, the first pressure-regulation valve 60 is disposed in a portion of the first flow path 48 that extends between the first control valve 42 and the pilot check valve 44, and the second pressure-regulation valve 62 is disposed in a portion of the second flow path 54 that extends between the first control valve 42 and the second hydraulic chamber 32b.

Figure 7:
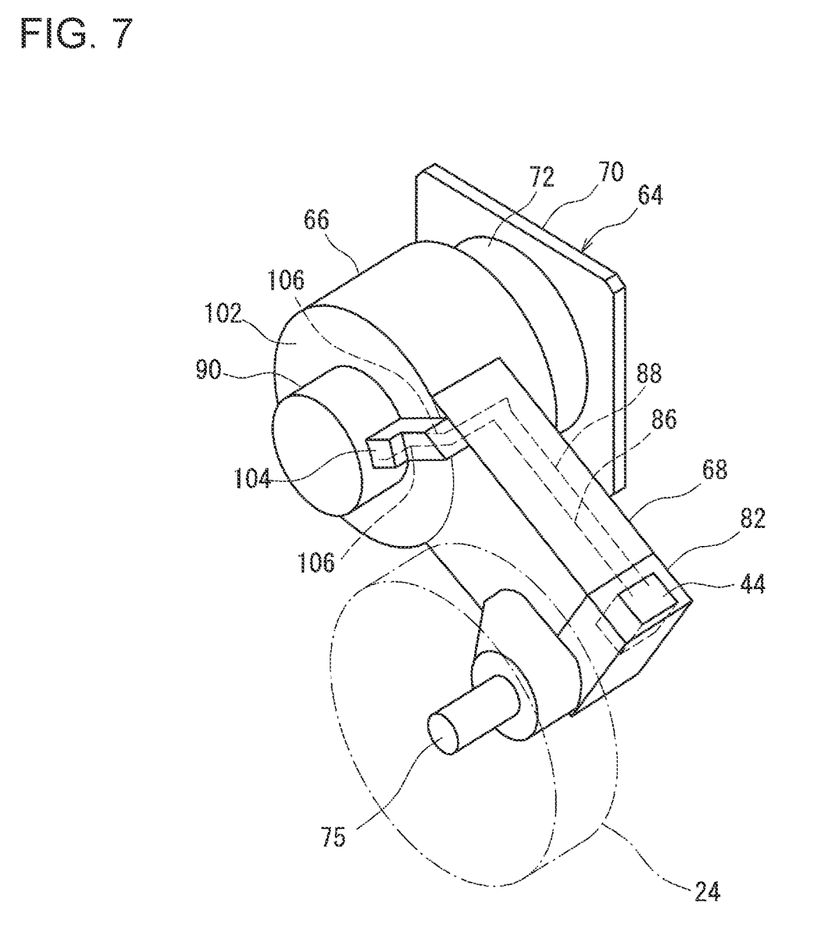
FIG. 7 is a schematic configuration diagram of a part of a suspension device for an amphibious vehicle according to some embodiments.
Figure 8:
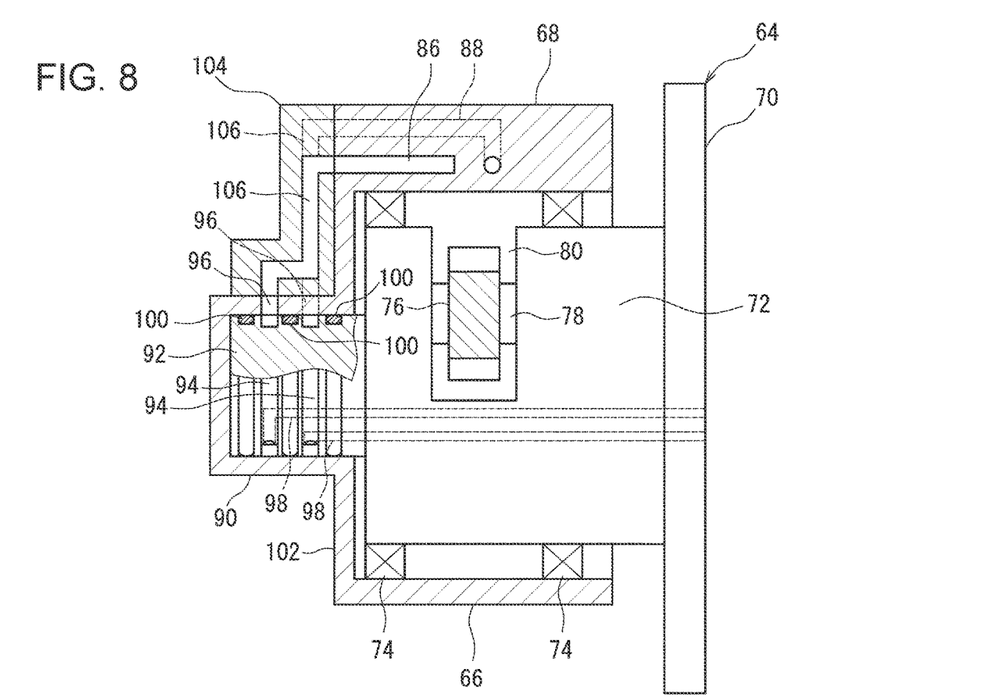
FIG. 8 is a partial schematic cross-sectional view of the suspension device in FIG. 7.
Figure 9:
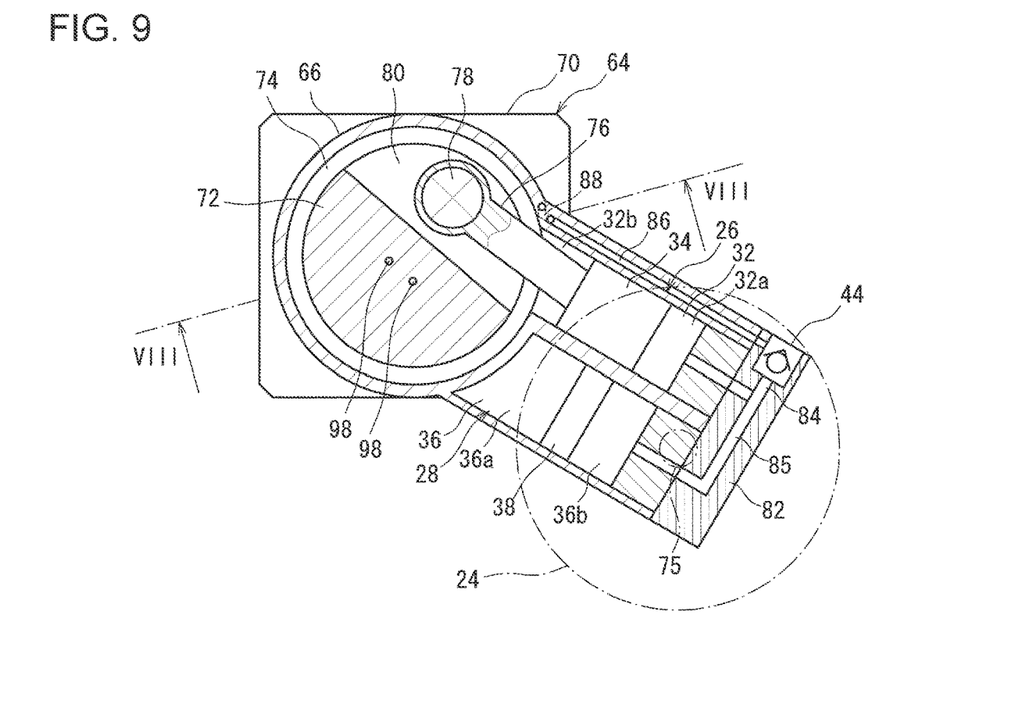
FIG. 9 is a partial schematic cross-sectional view of the suspension device in FIG. 7, showing a state in which the amphibious vehicle is traveling on land.
Figure 10:
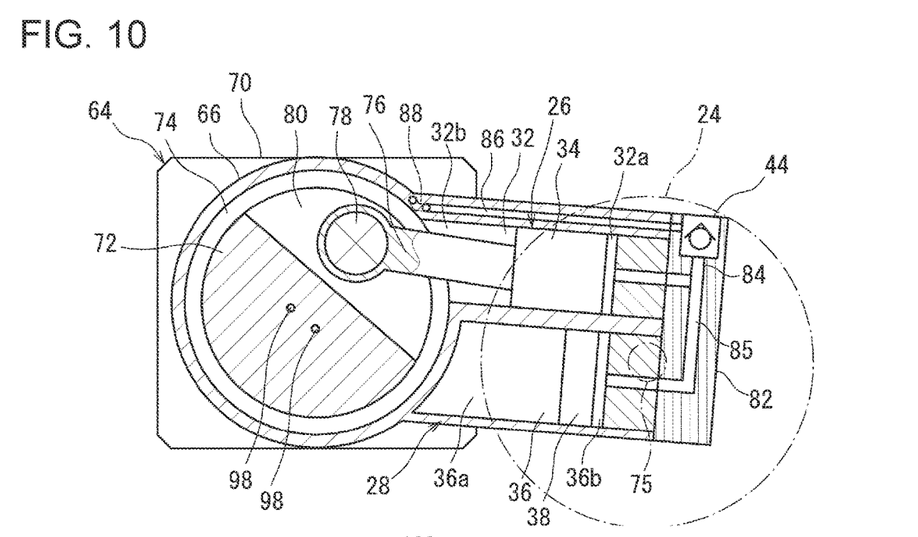
FIG. 10 is a partial schematic cross-sectional view of the suspension device in FIG. 7, showing a state in which the wheel is pulled up.

FIG. 7 is a schematic perspective view of a part of a suspension device according to some embodiments. FIGS. 8, 9, and 10 are schematic cross-sectional view of a part of the suspension device in FIG. 7.

As depicted in FIGS. 7 to 10, in some embodiments, the suspension device for an amphibious vehicle includes a base 64, a hub 66, and an arm 68. The base 64 is attachable to the vehicle body 10 of the amphibious vehicle, and has a flange section 70 for bolt connection, for instance. Further, the base 64 has a main shaft portion 72 having a substantially solid-cylindrical shape.

The hub 66 has a substantially hollow-cylindrical shape, and is rotatably engaged with the main shaft portion 72. For instance, two bearings 74 are interposed between the hub 66 and the main shaft portion 72.

The arm 68 is integrally formed with the hub 66, and is rotatable with respect to the main shaft portion 72 together with the hub 66. The arm 68 extends along the radial direction of the main shaft portion 72 and of the hub 66, with a support shaft 75 for supporting the wheel 24 mounted to a distal end of the arm 68. The hydraulic cylinder 26 and the accumulator 28 are disposed inside the arm 68.

With this configuration, the hydraulic cylinder 26 and the accumulator 28 are disposed inside the arm 68, and thereby it is no longer necessary to provide the hydraulic cylinder 26 and the accumulator 28 on the side of the vehicle body 10, which makes it possible to save the space.

The pump 40, the tank 52, the first control valve 42, the pilot check valve 44, and the second control valve 46 can be disposed inside the vehicle body 10, for instance.

In some embodiments, the hydraulic cylinder 26 and the accumulator 28 are disposed parallel to each other inside the arm 68, each extending along the radial direction of the main shaft portion 72 and the hub 66. The piston 34 disposed inside the hydraulic cylinder 26 is coupled to the pin 78 via a connection rod 76. The connection rod 76 is capable of tilting with respect to the piston 34 and the pin 78.

The pin 78 is disposed inside a cut-out portion 80 formed on the main shaft portion 72. The pin 78 extends along the axial direction of the main shaft portion 72, and is disposed away from the center in the radial direction of the main shaft portion 72.

The first hydraulic chamber 32a is disposed on the distal end side of the arm 68, and the second hydraulic chamber 32b is disposed on the root end side of the arm 68. The cut-out portion 80 is in communication with the hydraulic cylinder 26, and constitutes a part of the second hydraulic chamber 32b.

With this configuration, when the working fluid is supplied to the first hydraulic chamber 32a, the piston 34 is displaced relative to the cylinder body 32 so that the first hydraulic chamber 32a expands (see FIG. 9). At this time, the distance between the piston 34 and the pin 78 is determined by the connection rod 76, and thus the arm 68 revolves about the main shaft portion 72 so that the first hydraulic chamber 32a expands. As a result, the distal end of the arm 68 moves downward, and the wheel 24 is suspended.

In contrast, when the working fluid is supplied to the second hydraulic chamber 32b, the piston 34 is displaced relative to the cylinder body 32 so that the second hydraulic chamber 32b expands (see FIG. 10). At this time, the distance between the piston 34 and the pin 78 is determined by the connection rod 76, and thus the arm 68 revolves about the main shaft portion 72 so that the second hydraulic chamber 32b expands. As a result, the distal end of the arm 68 moves upward, and the wheel 24 is pulled up.

In some embodiments, the pilot check valve 44 is disposed inside the arm 68.

With this configuration, the pilot check valve 44 is disposed inside the arm 68, and thereby the distance between the first hydraulic chamber 32a and the pilot check valve 44 can be reduced. Thus, when the hydraulic pressure of the first hydraulic chamber 32a reaches a high pressure, the high pressure is applied to a smaller region, and thereby it is possible to prevent liquid leakage even more reliably.

In some embodiments, the pilot check valve 44 is disposed closer to the distal end of the arm 68 than the hydraulic cylinder 26.

With this configuration, the pilot check valve 44 can be disposed inside the arm 68 through a simple configuration. Further, in a case where the hydraulic cylinder 26 and the accumulator 28 are disposed parallel inside the arm 68 and the first hydraulic chamber 32a is disposed on the distal end side of the arm 68, the distance between the first hydraulic chamber 32a and the pilot check valve 44 can be reduced as much as possible. Thus, the high pressure of the first hydraulic chamber 32a is applied to an even smaller region when the pilot check valve 44 is closed, and thereby liquid leakage is prevented even more reliably.

In some embodiments, the arm 68 includes a block 82 that constitutes the distal end portion of the arm 68, and the pilot check valve 44 is mounted to the block 82. Further, an inner channel 84 is formed through the block 82 to bring the first hydraulic chamber 32a and the pilot check valve 44 into communication.

With this configuration, the pilot check valve 44 and the first hydraulic chamber 32a can communicate with each other simply through the inner channel 84.

In some embodiments, an inner channel 85 is formed through the block 82 to bring the first hydraulic chamber 32a and the hydraulic chamber 36b into communication.

With this configuration, the first hydraulic chamber 32a and the hydraulic chamber 36b can communicate with each other simply through the inner channel 85.

In some embodiments, two inner channels 86, 88 are formed through the arm 68. The pilot check valve 44 and the first control valve 42 are in communication with each other through the inner channel 86, and the pilot check valve 44 and the second control valve 46 are in communication with each other through the inner channel 88. With this configuration, the inner channels 86, 88 are disposed inside the arm 68, and thereby it is possible to reduce the length of pipe outside the arm 68, thus reducing the size and weight and improving durability against dirt and the like.

In some embodiments, the inner channels 86, 88 have sections that extend along the radial direction of the arm 68.

In some embodiments, the inner channels 86, 88 can be easily formed by hole-machining on the arm 68.

In some embodiments, the suspension device has a hollow cylindrical sleeve 90 formed integrally with the hub 66, and the base 64 has a solid cylindrical portion 92 protruding from the main shaft portion 72. The sleeve 90 is rotatably engaged with the solid cylindrical portion 92. Further, a plurality of circumferential grooves 94 is formed on the outer periphery of the solid cylindrical portion 92, and a plurality of communication holes 96 is formed on the sleeve 90 so as to correspond to the plurality of circumferential grooves 94. A plurality of inner channels 98 extend through the main shaft portion 72 and the solid cylindrical portion 92, and have ends each having an opening formed on the bottom surface of a corresponding one of the plurality of circumferential grooves 94. An O-ring 100 is disposed on each side of the plurality of circumferential grooves 94.

The arm 68 rotates relative to the main shaft portion 72 and to the vehicle body 10, which raises a problem in the connection structure between the inner channels 86, 88 of the arm 68 (movable side) and the vehicle body 10 side (stationary side). With the above configuration, the circumferential grooves 94 are formed on the outer periphery of the solid cylindrical portion 92, which is on the stationary side, and thereby it is possible to bring the inner channels 86, 88 of the arm 68 and the inner channel 98 of the stationary side into communication at a predetermined rotational angle.

In some embodiments, the suspension device includes an end plate 102 having an annular shape and connecting the hub 66 and the sleeve 90. A block 104 is attached to the end plate 102 to connect the inner channels 86, 88 formed through the arm 68 and the communication holes 96 of the sleeve 90. A plurality of inner channels 106 is formed through the block 104. The communication holes 96 of the sleeve 90 are in communication with the inner channels 86, 88 of the arm 68 through the inner channels 106 of the block 104.

Figure 11:
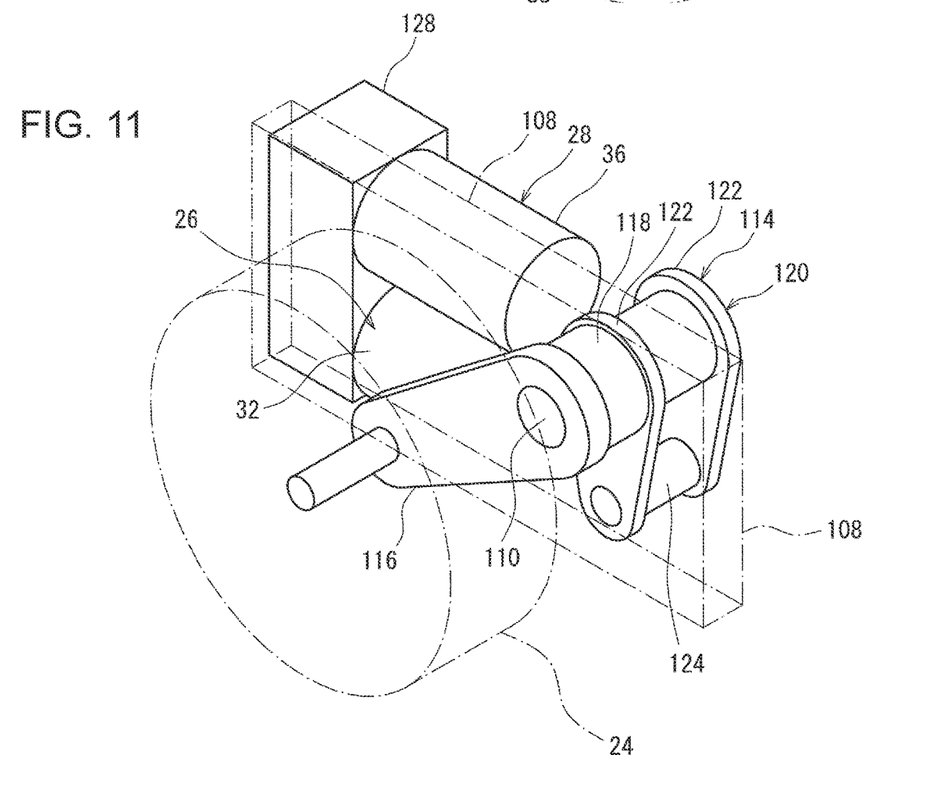
FIG. 11 is a schematic configuration diagram of a part of a suspension device for an amphibious vehicle according to some embodiments.
Figure 12:
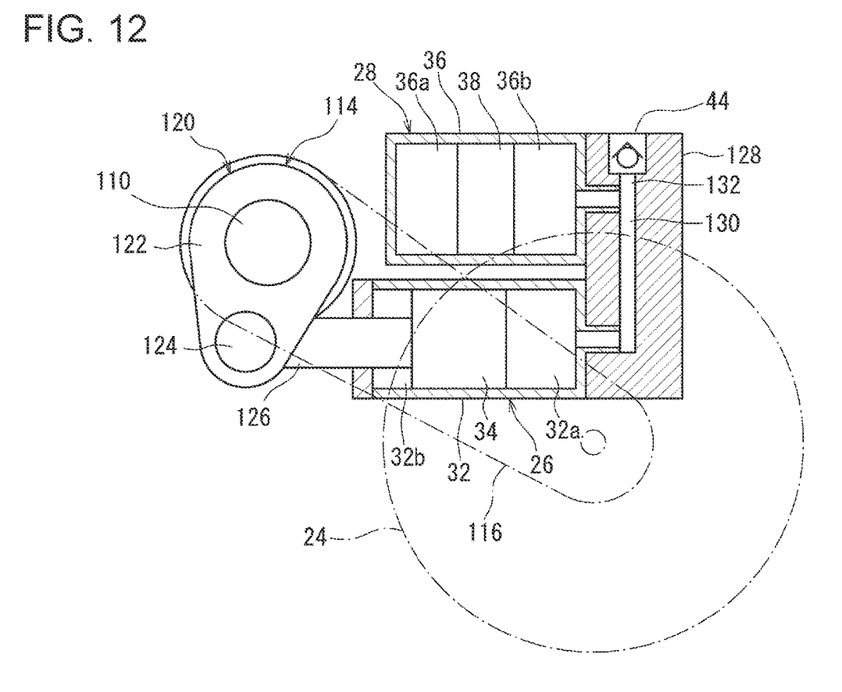
FIG. 12 is a partial schematic cross-sectional view of the suspension device in FIG. 11, showing a state in which the amphibious vehicle is traveling on land.
Figure 13:
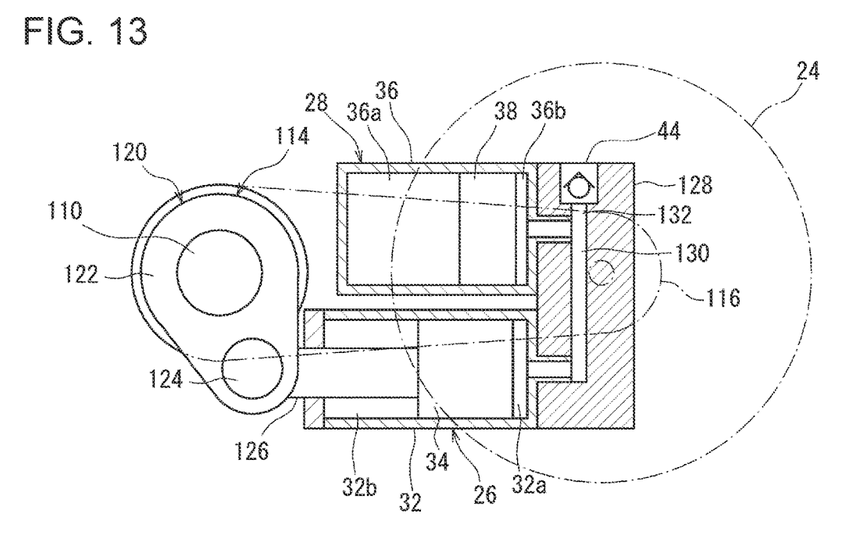
FIG. 13 is a partial schematic cross-sectional view of the suspension device in FIG. 11, showing a state in which the wheel is pulled up.

FIG. 11 is a schematic perspective view of a part of a suspension device according to some embodiments. FIGS. 12 and 13 are schematic cross-sectional views of a part of the suspension device in FIG. 11.

As depicted in FIGS. 11 to 13, in some embodiments, the suspension device for an amphibious vehicle includes a base 108 that is attachable to the vehicle body 10 of the amphibious vehicle, a rotational shaft 110 supported rotatably by the base 108, a conversion mechanism 114 configured to convert reciprocating motion of the piston 34 of the hydraulic cylinder 26 into rotational motion of the rotational shaft 110, and an arm 116 configured to be rotatable with the rotational shaft 110.

The rotational shaft 110 is supported by the base 108 via a bearing 118.

The conversion mechanism 114 includes a crank member 120, and the crank member 120 includes a crank arm 122 and a crank pin 124. The root end side of the crank arm 122 is fixed to the rotational shaft 110, and a crank pin 124 is fixed to the tip side of the crank arm 122. The crank pin 124 is coupled to the piston 34 via a connection rod 126, so that the reciprocating motion of the piston 34 is converted into the pivoting motion of the crank member 120, and the pivoting motion of the crank member 120 is further converted into the rotational motion of the rotational shaft 110.

Further, the rotational motion of the rotational shaft 110 causes the arm 116 to pivot, and thereby the wheel 24 mounted to the distal end of the arm 116 is pulled up (see FIG. 13) or is suspended (see FIG. 12).

Further, the hydraulic cylinder 26 and the accumulator 28 may be disposed inside the vehicle body 10 of the amphibious vehicle.

With this configuration, the hydraulic cylinder 26 and the accumulator 28 can be disposed inside the vehicle body 10, and thereby the hydraulic cylinder 26, the accumulator 28, and the like can be easily replaced. Accordingly, the suspension device has a high expandability.

The pump 40, the tank 52, the first control valve 42, the pilot check valve 44, and the second control valve 46 can be disposed inside the vehicle body 10 of the amphibious vehicle, for instance.

In some embodiments, as depicted in FIGS. 11 to 13, the hydraulic cylinder 26 and the accumulator 28 are disposed parallel to each other, and an inner channel 130 is formed through a block 128 that couples an end portion of the hydraulic cylinder 26 closer to the first hydraulic chamber 32a and an end portion of the accumulator 28 closer to the hydraulic chamber 36b, the inner channel 130 bringing the first hydraulic chamber 32a and the hydraulic chamber 36b into communication. Further, the pilot check valve 44 is mounted to the block 128, and an inner channel 132 is formed through the block 128 to bring the first hydraulic chamber 32a and the pilot check valve 44 into communication.

With this configuration, the pilot check valve 44 is mounted to the block 128 coupling an end portion of the hydraulic cylinder 26 closer to the first hydraulic chamber 32a and an end portion of the accumulator 28 closer to the hydraulic chamber 36b, and thereby the distance between the first hydraulic chamber 32a and the pilot check valve 44 can be minimized. Thus, the high pressure of the first hydraulic chamber 32a is applied to a smaller region when the pilot check valve 44 is closed, and thereby liquid leakage is prevented even more reliably.

Further, with this configuration, the pilot check valve 44 and the first hydraulic chamber 32a can communicate with each other simply through the inner channel 132.

Embodiments of the present invention were described in detail above, but the present invention is not limited thereto, and various amendments and modifications may be implemented.

DESCRIPTION OF REFERENCE NUMERALS

10 Vehicle body
12 Land traveling device
14 Water propelling device
16 Water jet
18 Crawler
20 Track roller
22 Sprocket (wheel)
24 Rotational element (wheel)
26 Hydraulic cylinder
28 Accumulator
30 Pressure system
32 Cylinder body
32a First hydraulic chamber
32b Second hydraulic chamber
34 Piston
36 Cylinder body
36a Gas-pressure chamber
36b Hydraulic chamber 38 Piston
40 Pump
42 First control valve
42p P-port
42t T-port
42a A-port
42b B-port
44 Pilot check valve
46 Second control valve
48 First flow path
50 Pilot flow path
52 Tank
54 Second flow path
56 Controller
57 Connection rod

The invention claimed is:

1. A suspension device for an amphibious vehicle, comprising:
　a hydraulic cylinder including a cylinder body and a piston disposed slidably inside the cylinder body, the piston defining a first hydraulic chamber and a second hydraulic chamber inside the cylinder body;
　an accumulator connected to the first hydraulic chamber of the hydraulic cylinder; and
　a pressure system configured to selectively perform supply of a working fluid to one of the first hydraulic chamber or the second hydraulic chamber of the hydraulic cylinder and discharge of the working fluid from the other one of the first hydraulic chamber or the second hydraulic chamber,
　wherein the pressure system includes:
　　a pump configured to discharge the working fluid;
　　a first control valve disposed in a first flow path extending between the pump and the first hydraulic chamber, the first control valve being configured to control supply of the working fluid from the pump to the first hydraulic chamber;
　　a pilot check valve disposed in a portion of the first flow path which extends between the first hydraulic chamber and the first control valve, the pilot check valve being configured to open and close the first flow path in accordance with a pilot pressure; and
　　a second control valve disposed in a pilot flow path extending between the pump and the pilot check valve, the second control valve being configured to control supply of the pilot pressure to the pilot check valve, and
　wherein the accumulator is directly connected to the first hydraulic chamber without passing through the first flow path.

2. The suspension device for an amphibious vehicle according to claim 1,
　further comprising at least one pressure-regulation valve for regulating a pressure of the working fluid discharged from the pump.

3. A suspension device for an amphibious vehicle, comprising:
　a hydraulic cylinder including a cylinder body and a piston disposed slidably inside the cylinder body, the piston defining a first hydraulic chamber and a second hydraulic chamber inside the cylinder body;
　an accumulator connected to the first hydraulic chamber of the hydraulic cylinder; and
　a pressure system configured to selectively perform supply of a working fluid to one of the first hydraulic chamber or the second hydraulic chamber of the hydraulic cylinder and discharge of the working fluid from the other one of the first hydraulic chamber or the second hydraulic chamber,
　wherein the pressure system includes:
　　a pump configured to discharge the working fluid;
　　a first control valve disposed in a first flow path extending between the pump and the first hydraulic chamber, the first control valve being configured to control supply of the working fluid from the pump to the first hydraulic chamber;
　　a pilot check valve disposed in a portion of the first flow path which extends between the first hydraulic chamber and the first control valve, the pilot check valve being configured to open and close the first flow path in accordance with a pilot pressure;
　　a second control valve disposed in a pilot flow path extending between the pump and the pilot check valve, the second control valve being configured to control supply of the pilot pressure to the pilot check valve; and
　　at least one pressure-regulation valve for regulating a pressure of the working fluid discharged from the pump,
　wherein the at least one pressure-regulation valve comprises a first pressure-regulation valve configured to regulate a pressure of the working fluid to be supplied to the first hydraulic chamber, and a second pressure-regulation valve configured to regulate a pressure of the working fluid to be supplied to the second hydraulic chamber, and
　wherein the pressure of the working fluid regulated by the second pressure-regulation valve is lower than the pressure of the working fluid regulated by the first pressure-regulation valve.

4. The suspension device for an amphibious vehicle according to claim 1, further comprising:
　a base having a main shaft portion, the base being mountable to a vehicle body of the amphibious vehicle;
　a hub being engaged rotatably with the main shaft portion; and
　an arm provided integrally with the hub,
　wherein the hydraulic cylinder and the accumulator are disposed inside the arm.

5. The suspension device for an amphibious vehicle according to claim 4, wherein the pilot check valve is disposed inside the arm.

6. The suspension device for an amphibious vehicle according to claim 4,
　wherein the pilot check valve is disposed closer to a distal end side of the arm than the hydraulic cylinder.

7. The suspension device for an amphibious vehicle according to claim 6,
　wherein the arm includes a block constituting a distal end portion of the arm,
　wherein the pilot check valve is mounted to the block, and
　wherein an inner channel which brings the first hydraulic chamber and the pilot check valve into communication is disposed inside the block.

8. The suspension device for an amphibious vehicle according to claim 5,
　wherein an inner channel which brings the pilot check valve and the first control valve into communication is formed inside the arm.

9. A suspension device for an amphibious vehicle, comprising:
　a hydraulic cylinder including a cylinder body and a piston disposed slidably inside the cylinder body, the piston defining a first hydraulic chamber and a second hydraulic chamber inside the cylinder body;

an accumulator connected to the first hydraulic chamber of the hydraulic cylinder;

a pressure system configured to selectively perform supply of a working fluid to one of the first hydraulic chamber or the second hydraulic chamber of the hydraulic cylinder and discharge of the working fluid from the other one of the first hydraulic chamber or the second hydraulic chamber;

a base having a main shaft portion, the base being mountable to a vehicle body of the amphibious vehicle;

a hub being engaged rotatably with the main shaft portion; and an arm provided integrally with the hub, wherein the hydraulic cylinder and the accumulator are disposed inside the arm, wherein the pressure system includes:
    a pump configured to discharge the working fluid;
    a first control valve disposed in a first flow path extending between the pump and the first hydraulic chamber, the first control valve being configured to control supply of the working fluid from the pump to the first hydraulic chamber;
    a pilot check valve disposed in a portion of the first flow path which extends between the first hydraulic chamber and the first control valve, the pilot check valve being configured to open and close the first flow path in accordance with a pilot pressure; and
    a second control valve disposed in a pilot flow path extending between the pump and the pilot check valve, the second control valve being configured to control supply of the pilot pressure to the pilot check valve, wherein the pilot check valve is disposed inside the arm, and wherein an inner channel which brings the pilot check valve and the first control valve into communication is formed inside the arm, the suspension device further comprising a sleeve having a hollow cylindrical shape and being formed integrally with the hub, wherein the base includes a solid cylindrical portion which protrudes from the main shaft portion and which engages with the sleeve, wherein the solid cylindrical portion has a plurality of circumferential grooves formed on an outer periphery of the solid cylindrical portion, wherein the sleeve has a plurality of communication holes formed corresponding to the plurality of circumferential grooves, and wherein the plurality of circumferential grooves each have a bottom surface on which an opening of an end of a corresponding one of a plurality of inner channels is formed, the plurality of inner channels extending through the main shaft portion and the solid cylindrical portion.

10. The suspension device for an amphibious vehicle according to claim 1, further comprising:
    a base mountable to a vehicle of the amphibious vehicle;
    a rotational shaft supported rotatably by the base; and
    a conversion mechanism configured to convert reciprocating motion of the piston into reciprocating motion of the rotational shaft, wherein the hydraulic cylinder and the accumulator are mountable inside a vehicle body of the amphibious vehicle.

11. The suspension device for an amphibious vehicle according to claim 10, further comprising a block connecting an end portion of the hydraulic cylinder and an end portion of the accumulator, wherein the pilot check valve is attached to the accumulator, and wherein an inner channel which brings the first hydraulic chamber and the pilot check valve into communication is disposed inside the block.

12. The suspension device for an amphibious vehicle according to claim 2, further comprising two pressure-regulation valves.

\* \* \* \* \*